United States Patent
Venkata et al.

(10) Patent No.: US 7,131,024 B1
(45) Date of Patent: Oct. 31, 2006

(54) MULTIPLE TRANSMIT DATA RATES IN PROGRAMMABLE LOGIC DEVICE SERIAL INTERFACE

(75) Inventors: Ramanand Venkata, San Jose, CA (US); Chong H Lee, San Ramon, CA (US); Rakesh Patel, Cupertino, CA (US)

(73) Assignee: Altera Corporation, San Jose, CA (US)

( * ) Notice: Subject to any disclaimer, the term of this patent is extended or adjusted under 35 U.S.C. 154(b) by 406 days.

(21) Appl. No.: 10/670,813

(22) Filed: Sep. 24, 2003

(51) Int. Cl.
*G06F 1/06* (2006.01)
(52) U.S. Cl. .................................. 713/500
(58) Field of Classification Search ................ 713/500
See application file for complete search history.

(56) References Cited

U.S. PATENT DOCUMENTS

| | | | |
|---|---|---|---|
| 3,473,160 A | 10/1969 | Wahlstrom | 326/41 |
| 4,025,865 A * | 5/1977 | Munday et al. | 327/107 |
| 4,486,739 A | 12/1984 | Franaszek et al. | 341/59 |
| 5,341,091 A * | 8/1994 | Kurita | 324/750 |
| 5,586,308 A * | 12/1996 | Hawkins et al. | 713/501 |
| 5,689,195 A | 11/1997 | Cliff et al. | 326/41 |
| 5,802,103 A | 9/1998 | Jeong | 375/220 |
| 5,809,281 A * | 9/1998 | Steele et al. | 711/170 |
| 5,811,987 A * | 9/1998 | Ashmore et al. | 326/39 |
| 5,903,746 A * | 5/1999 | Swoboda et al. | 713/501 |
| 5,909,126 A | 6/1999 | Cliff et al. | 326/41 |
| 6,031,428 A | 2/2000 | Hill | 331/11 |
| 6,055,644 A * | 4/2000 | Henkel | 713/501 |
| 6,215,326 B1 | 4/2001 | Jefferson et al. | 326/41 |
| 6,240,471 B1 | 5/2001 | Schlueter et al. | 710/62 |
| 6,270,350 B1 | 8/2001 | Christopher | 434/69 |
| 6,282,184 B1 * | 8/2001 | Lehman et al. | 370/342 |
| 6,370,603 B1 | 4/2002 | Silverman et al. | 710/72 |
| 6,388,591 B1 | 5/2002 | Ng | 341/100 |
| 6,407,576 B1 | 6/2002 | Ngai et al. | 326/41 |
| 6,708,239 B1 * | 3/2004 | Ellerbrock et al. | 710/62 |
| 6,731,142 B1 * | 5/2004 | Wang et al. | 327/115 |
| 2001/0033188 A1 | 10/2001 | Aung et al. | 327/41 |
| 2002/0110210 A1 * | 8/2002 | May et al. | 375/357 |
| 2002/0190751 A1 | 12/2002 | Lee et al. | 326/39 |
| 2003/0052709 A1 | 3/2003 | Venkata et al. | 326/37 |
| 2003/0123596 A1 * | 7/2003 | Tolson | 375/376 |

(Continued)

OTHER PUBLICATIONS

Agere Systems, Inc., "ORCA ORT82G5 0.622/1.0-1.25/2.0-2.5/3.125 Gbits/s Backplane Interface FPSC," Preliminary Data Sheet, pp. 1-35 (Jul. 2001).

(Continued)

*Primary Examiner*—Thomas Lee
*Assistant Examiner*—Vincent Tran
(74) *Attorney, Agent, or Firm*—Fish & Neave IP Group of Ropes & Gray LLP; Jeffrey H. Ingerman

(57) ABSTRACT

A serial interface for a programmable logic device provides multiple data rates in different channels by generating a central serial clock and providing at least one divider in each channel that can divide the central clock by different integer values. For additional variation in clock rate, two or more different central clocks can be provided, with each channel then being able to divide any of the central clocks to provide the desired local clock. Lower speed parallel clocks can be generated locally by further dividing the divided serial clock. Alternatively, the central serial clock or clocks may be divided centrally to provide a central parallel clock or clocks which can then be used locally as a local parallel clock.

27 Claims, 5 Drawing Sheets

U.S. PATENT DOCUMENTS

2003/0155955 A1    8/2003   Andrasic et al. ............ 327/277
2004/0205432 A1*  10/2004   Gage et al. ................. 714/731

OTHER PUBLICATIONS

Agere Systems, Inc., "ORCA ORT8850 Field-Programmable System Chip (FPSC) Eight Channel x 850 Mbits/s Backplane Transceiver," Product Brief, pp. 1-6 (Jul. 2001).

Agere Systems, Inc., "ORCA ORT8850 Field-Programmable System Chip (FPSC) Eight Channel x 850 Mbits/s Backplane Transceiver," Product Brief, pp. 1-36 (Aug. 2001).

Cook, Barry M., "IEEE 1355 Data-Strobe Links: ATM Speed at RS232 Cost," *Microprocessors and Microsystems*, vol. 21, No. 7-8, pp. 421-428 (Mar. 30, 1998).

Electronic Trend Publications, Inc., "Lucent Introduces 10Gb/s Ethernet FPGAs," *Programmable Logic News and Views*, vol. 9, No. 11, pp. 7-8 (Nov. 2000).

Konstas, Jason, "Converting Wide, Parallel Data Buses to High Speed Serial Links," *International IC '99 Conference Proceedings*, pp. 19-30 (1991).

Lemme, Helmuth, "Schnelle Chips Für 'Flaschenhälse'," *Elektonik*, vol. 40, No. 22, pp. 104-109 (Oct. 29, 1991).

Lucent Technologies, Inc., "Protocol Independent Gigabit Backplane Transceiver Using Lucent OTR4622/ORT8850 FPSCs," Application Note, pp. 1-10 (Jun. 2000).

Lucent Technologies, Inc., "ORCA ORT82G5 0.622/1.0-1.25/2.0-2.5/3.125 Gbits/s Backplane Interface FPSC," Product Brief, pp. 1-8 (Feb. 2001).

Xilinx, Inc., *Virtex-II Pro Platform FPGA Handbook* (UG012 Version 1.0), pp. 1-6, 27-32, 121-126, and 162-180 (Jan. 31, 2002).

Xilinx, Inc., Rocket I/O Transceiver User Guide (UG024 Version 1.2), pp. 1-106 (Feb. 25, 2002).

* cited by examiner

MULTIPLE TRANSMIT DATA RATES IN PROGRAMMABLE LOGIC DEVICE SERIAL INTERFACE

BACKGROUND OF THE INVENTION

This invention relates to a multiple channel high-speed serial interface, especially in a programmable logic device, in which different channels may have different transmit data rates.

Recently, PLDs have begun to incorporate high-speed serial interfaces to accommodate high-speed (i.e., greater than 1 Gbps) serial I/O standards—e.g., the XAUI (10 Gbps Extended Attachment Unit Interface) standard. In accordance with the XAUI standard, a high-speed serial interface includes transceiver groups known as "quads," each of which includes four transceivers and some central logic. Within each transceiver, the receiver portion typically includes a phase-locked loop ("PLL"), primarily for the purpose of enabling clock data recovery from a received high-speed serial signal. In addition, the central logic typically includes a PLL, primarily for the purpose of generating a transmit clock to be used by the transmitter portion of each of the four transceivers, and in some cases for generating a reference clock for the receiver PLLs.

In many cases, the individual receivers or transmitters in a quad are intended to be used together, for multi-channel reception or transmission of related signals. In such applications, there is no disadvantage in having a common transmit clock generated in the central logic. However, particularly in programmable logic where the use to which a user puts portions of the device may be unexpected, in some applications the individual channels may be used separately, and it may be desirable to be able to use different transmit clocks in the different channels of the quad.

SUMMARY OF THE INVENTION

The present invention provides high-speed serial interface circuitry on a programmable logic device with the ability for different channels to use different transmit clocks based on a common clock source. This is achieved by providing in each channel one or more dividers that can divide the common clock by one or more integer values, providing one or more clocks that are "integer fractions" of the common clock—i.e., one or more clocks of which the common clock is an integer multiple.

In one preferred embodiment, the central logic of each quad of the serial interface has a single PLL or other clock source to provide a transmit clock, and each channel in that quad has one divider for optionally providing, under control of the user, or under control of logic in the programmable logic core of the PLD, a clock that is an integer fraction of the common clock.

The number of variations on that preferred embodiment are limited only by the device area which one is prepared to devote to the serial interface. Thus, in another preferred embodiment, the divider in each channel may provide a programmable selection of two or more integers by which to divide the common clock, although such a divider would consume more device area than a divider capable of division by only one integer. In a further embodiment, one or more channels may have more than one such divider. In one variant of that further embodiment, all dividers in a channel with more than one divider may provide the same selection of integers by which to divide the common clock. In another variant of that further embodiment, each divider in a channel with more than one divider may provide a different selection of integers by which to divide the clock. In any of these embodiments and variants, all channels can be equipped with the a divider or set of dividers providing the same integer or set of integers by which the common clock may be divided, or different channels can be equipped with different dividers or sets of dividers providing different integers or sets of integers by which the common clock may be divided.

In the embodiments and variants thus far described, each quad has a single common clock. However, and again depending on the available device area, it may be possible in another embodiment to provide a second common clock source (or even further additional common clock sources). In such a case, the divider or dividers in each channel could be replicated for each common clock source, or a selection device, such as a multiplexer, could be provided allowing selection of a particular common clock source for input into a particular divider. Thus, in one preferred embodiment, there may be two common clock sources in a single central control circuitry. If the number of clock rates needed exceeds those that can be provided using integer fractions of the clock or clocks provided in the central control circuitry, additional clocks may be provided in the central control circuitry of another quad, if present.

Regardless of the number of common clock sources, where there is more than one divider provided, a selection device, such as a multiplexer, could be provided in each channel allowing selection of the output of a particular divider as the transmit clock for that channel. Even if a channel has only a single divider, a multiplexer may be provided to allow selection between the divider output and the undivided common clock (although this would not be necessary where the divider is one, as is described above, that allows a choice among multiple integers and one of those integers is 1).

High-speed serial interfaces of the type being discussed commonly are used to convert high-speed serial data to parallel data for use in a device, such as a programmable logic device, that operates in parallel mode. Therefore, it is common for such a high-speed serial interface to include a divider in the central control circuitry for providing a parallel clock which is an integer fraction of the common clock, which itself is provided as a serial clock. The integer fraction generally reflects the number of bits per byte. In such an interface, the common clock provided by the central control circuitry to the individual channels is actually two common clocks—one serial and one parallel. By extension, every divider provided in one of the channels as discussed above, for converting the common clock to a channel clock, may actually be two dividers—one for converting the serial clock from the common serial clock rate to the channel serial clock rate, and one for converting the parallel clock from the common parallel clock rate to the channel parallel clock rate. Alternatively, the local parallel clock may be derived from the locally divided serial clock by a further local divider.

Thus, in accordance with the present invention, there is provided a serial interface for use in a programmable logic device. The serial interface includes a plurality of channels, each of the channels including at least transmit circuitry. The interface also includes central control circuitry including at least one clock source for generating at least one transmit clock for use by the transmit circuitry in each of the channels. Each such transmit clock has a respective first clock rate. Clock division circuitry in at least one of the channels provides from each such transmit clock a channel-derived clock having a second clock rate at most equal to the first clock rate. A programmable logic device incorporating such an interface is also provided.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

As described above, the present invention provides multiple transmit clocks for each individual channel of a high-speed serial interface from a smaller number of transmit clocks generated centrally in each quad of the interface. The multiple clocks are provided by dividing a centrally generated clock in a given quad. Preferably, each channel includes its own divider or dividers for generating whatever channel clocks it may need.

The use of dividers to generate the channel clocks limits the channel clocks to integer fractions (as defined above) of the centrally generated clock. Where other clocks may be needed that are not integer fractions of a single central clock, a second central clock may be provided that also can be divided to provide additional channel clocks. If device area is not a concern, still more central clocks can be provided. However, in a preferred embodiment, at most two central clocks are provided, and if any clock is needed that cannot be derived by division of those two clocks, then that clock can be provided in a separate quad, if present.

The invention will now be described with reference to FIGS. 1–4.

Figure 1:
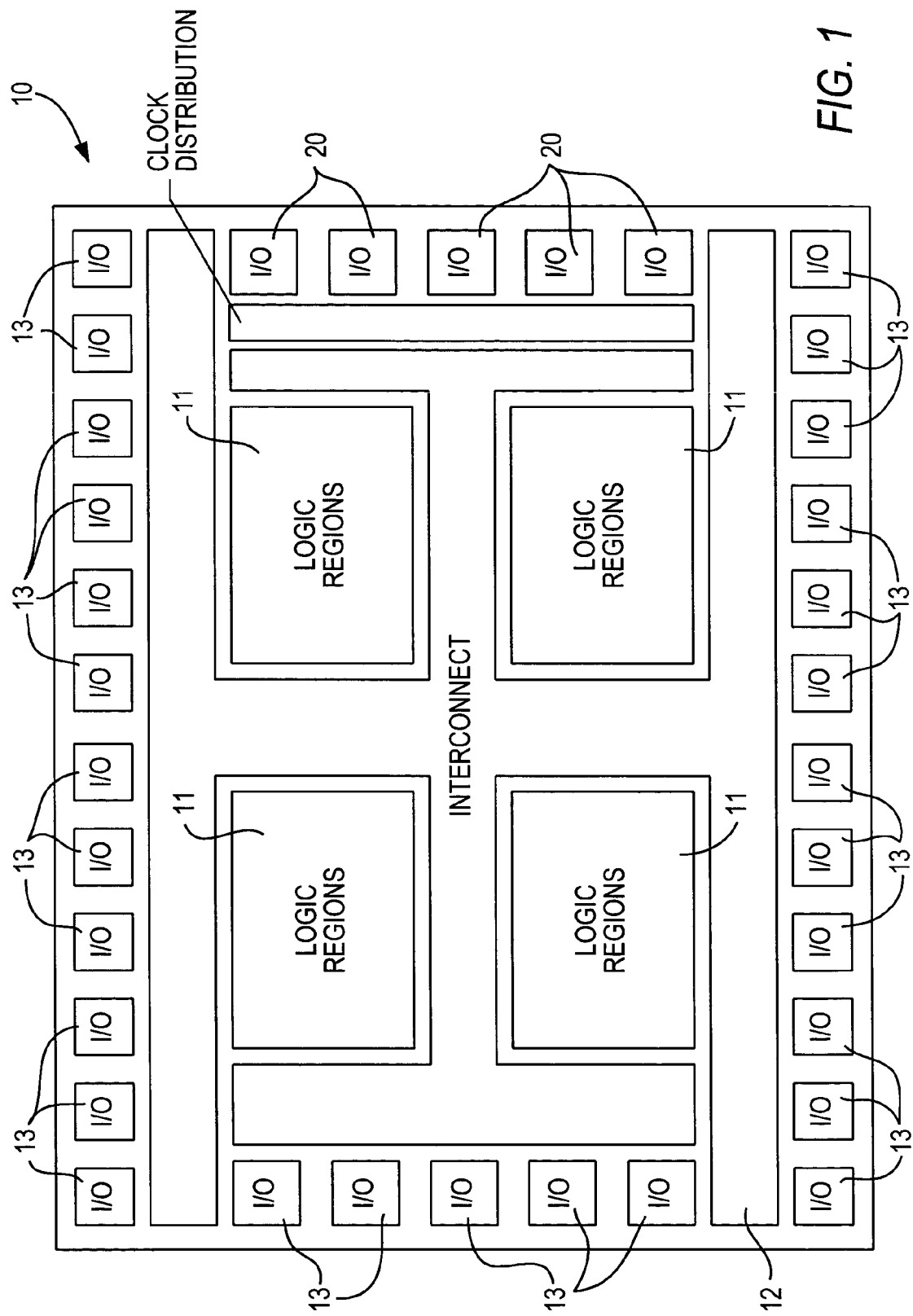
FIG. 1 is a block diagram of a preferred embodiment of a programmable logic device incorporating the present invention.

PLD 10, shown schematically in FIG. 1, is one example of a device incorporating a serial interface 20 according to the invention. PLD 10 has a programmable logic core including programmable logic regions 11 accessible to programmable interconnect structure 12. The layout of regions 11 and interconnect structure 12 as shown in FIG. 1 is intended to be schematic only, as many actual arrangements are known to, or may be created by, those of ordinary skill in the art.

PLD 10 also includes a plurality of other input/output ("I/O") regions 13. I/O regions 13 preferably are programmable, allowing the selection of one of a number of possible I/O signaling schemes, which may include differential and/or non-differential signaling schemes. Alternatively, I/O regions 13 may be fixed, each allowing only a particular signaling scheme. In some embodiments, a number of different types of fixed I/O regions 13 may be provided, so that while an individual region 13 does not allow a selection of signaling schemes, nevertheless PLD 10 as a whole does allow such a selection.

Figure 2:
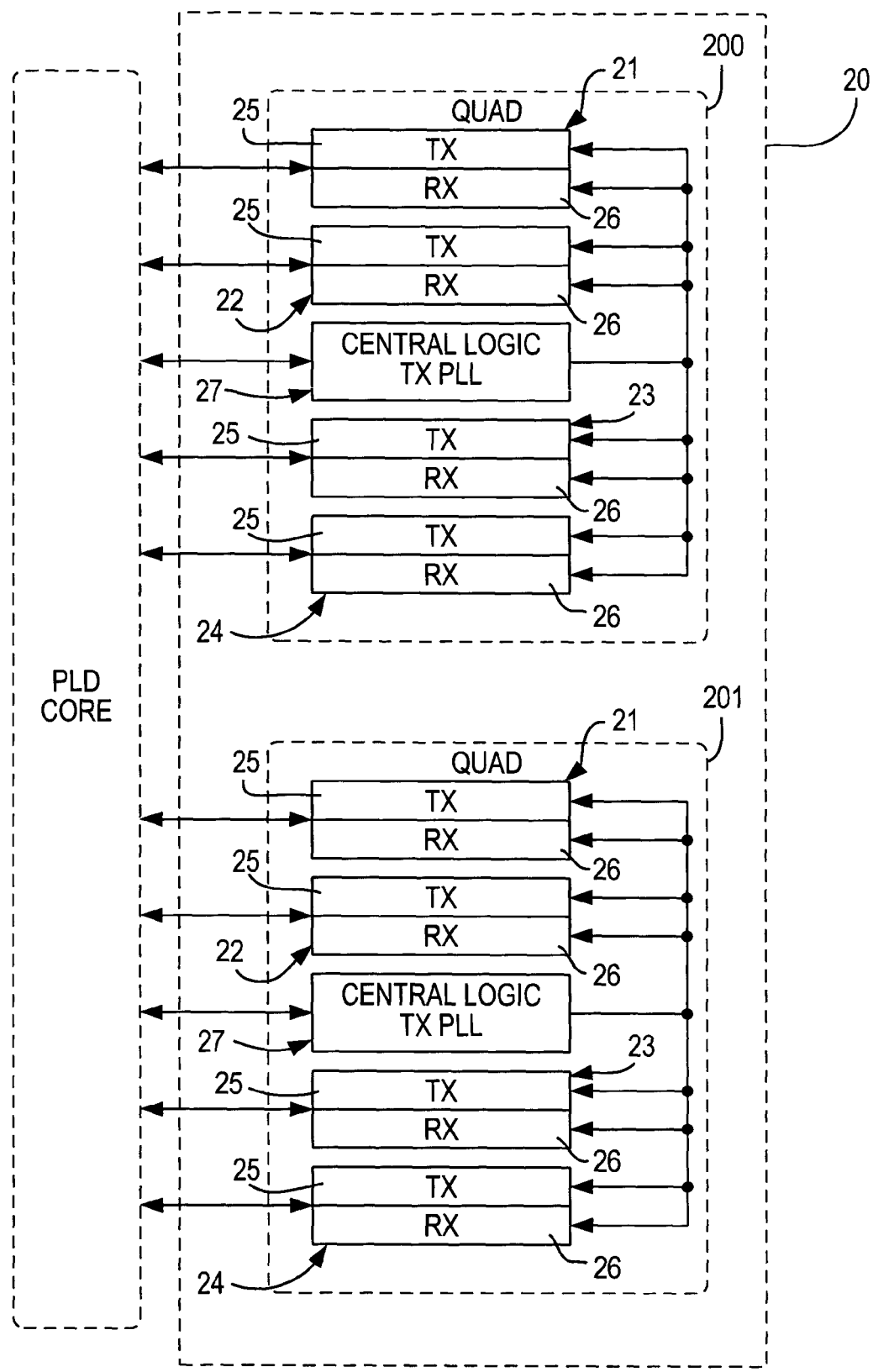
FIG. 2 is a schematic diagram of a serial interface incorporating the present invention.

For example, each I/O region 20 preferably is a high-speed serial interface as described above, similar to an interface capable of implementing the XAUI standard. Thus, as shown in FIG. 2, each interface 20 preferably includes one or more groupings 200, 201 having four channels 21–24, each including a transmitter 25 and a receiver 26, as well as central logic 27. As discussed above, because each such grouping includes four channels, it may be referred to as a "quad." However, it should be understood that in accordance with the present invention, which is not linked to any particular high-speed serial standard, each grouping 200, 201 can include any number of channels. Similarly, while each region 20 is shown to contain two groupings 200, 201, each region 20 may contain any number of groupings 200, 201.

As shown in FIG. 1, PLD 10 includes five interfaces 20. However, PLD 10 may include any desired number of interfaces 20, with a corresponding number of channels.

Within each interface 20, all transmitters 25 preferably are substantially identical, and all receivers 26 preferably are substantially identical, and preferably are substantially similar to known high-speed serial interface transmitters and receivers such as those used with the XAUI standard. Preferably the only differences among transmitters 25 are that each may have a different number or type of clock divider in accordance with the present invention, as discussed above and with reference to the drawings below. It further should be noted that any differences between transmitter 25 or receiver 26 and known high-speed serial transmitters and receivers preferably maintain compatibility with existing standards such as the XAUI standard, while adding capabilities as described herein.

Figure 3:
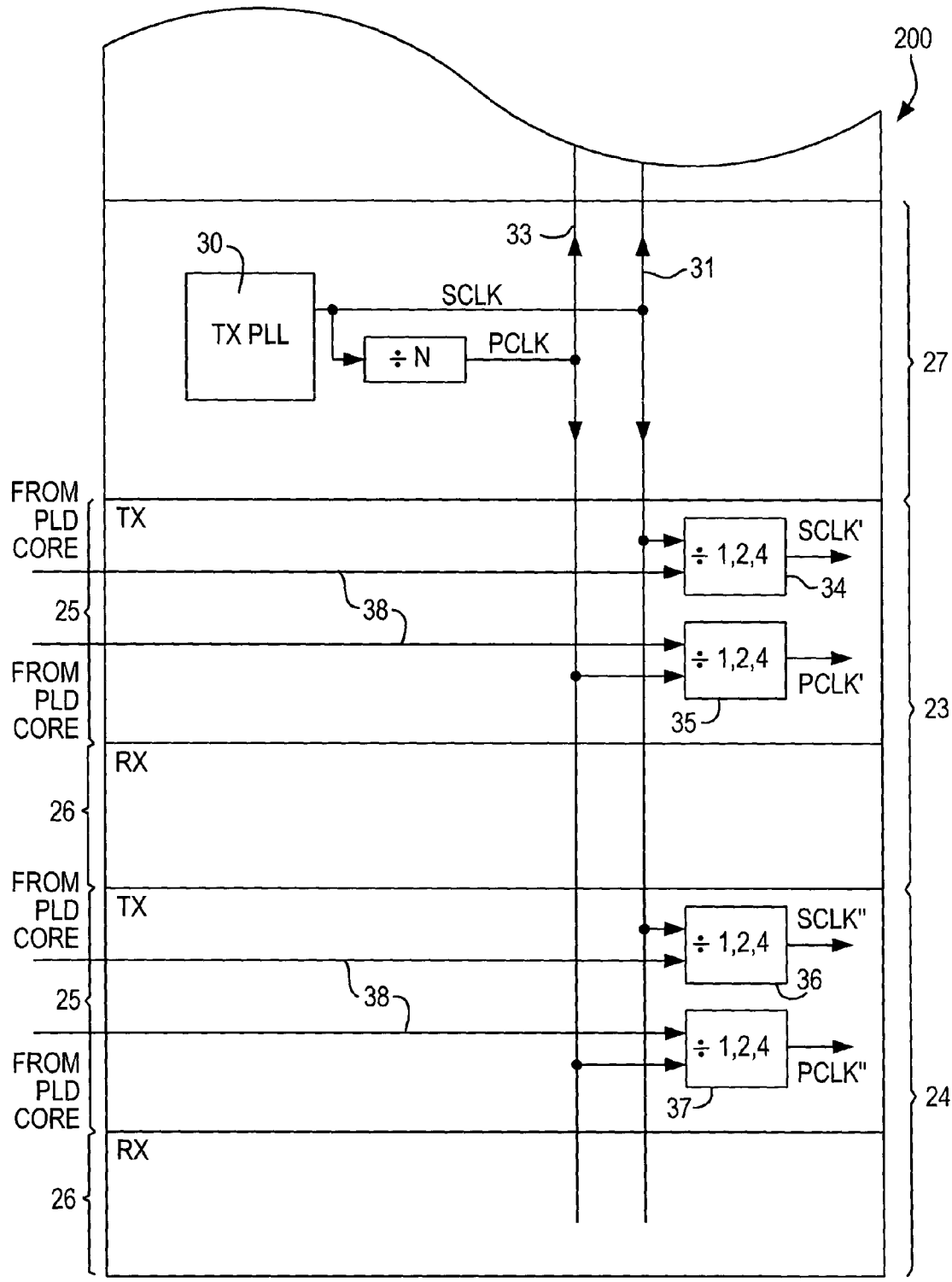
FIG. 3 is a schematic diagram showing detail of the central control circuitry and two transceivers of one quad of a first preferred embodiment of the interface of FIG. 2.

FIG. 3 shows schematically central logic 27, as well as channels 23, 24, of quad 200. With respect to channels 23, 24, FIG. 3 particularly shows a portion of each transmitter 25. As seen in FIG. 3, central logic 27 includes PLL 30 for generating a central serial transmit clock (SCLK) 31, and a divider 32 for dividing down central serial transmit clock 31 to provide central parallel transmit clock (PCLK) 33. For example, divider 32 typically will divide central serial clock 31 by 8 or 10 to reflect the number of bits in a byte, providing a central parallel clock 33 having a rate one-eighth or one-tenth that of central serial clock 31. However, other divisors can be used as required by the particular application.

As depicted in FIG. 3, in transmitter 25 of each channel 23, 24, both serial clock 31 and parallel clock 33 are input to respective dividers 34, 35, 36, 37. As shown in FIG. 3, all four dividers 34–37 are capable of dividing their respective input clocks by factors of 1, 2 or 4. Which factor is used may be programmed by the user when programming the rest of PLD 10, or user logic in the PLD core (see FIG. 2) could control any or all of dividers 34–37 via leads 38. Normally one would expect two dividers in the same transmitter 25 (e.g., dividers 34, 35 in channel 23 that derive SCLK' and PCLK', and dividers 36, 37 in channel 24 that derive SCLK" and PCLK") to be set to the same divisor, to maintain the same serial/parallel relationship as clocks 31, 33, although there may be applications where that is not the case. On the other hand, however, one would not be surprised to have the dividers in different channels—even where, as in FIG. 3, the choices of divisors is the same—set to different divisors, although there may be applications where all channels are similarly set. Moreover, there may be embodiments where the choices of divisors are not the same in each channel 23, 24, or even within a single channel, where flexibility to use different clock rates is necessary or desirable. In addition, if device area is not a concern, additional dividers with other choices of divisors, or bigger dividers with more choices of divisors, can also be provided (not shown) in one or more channels.

Figure 4:
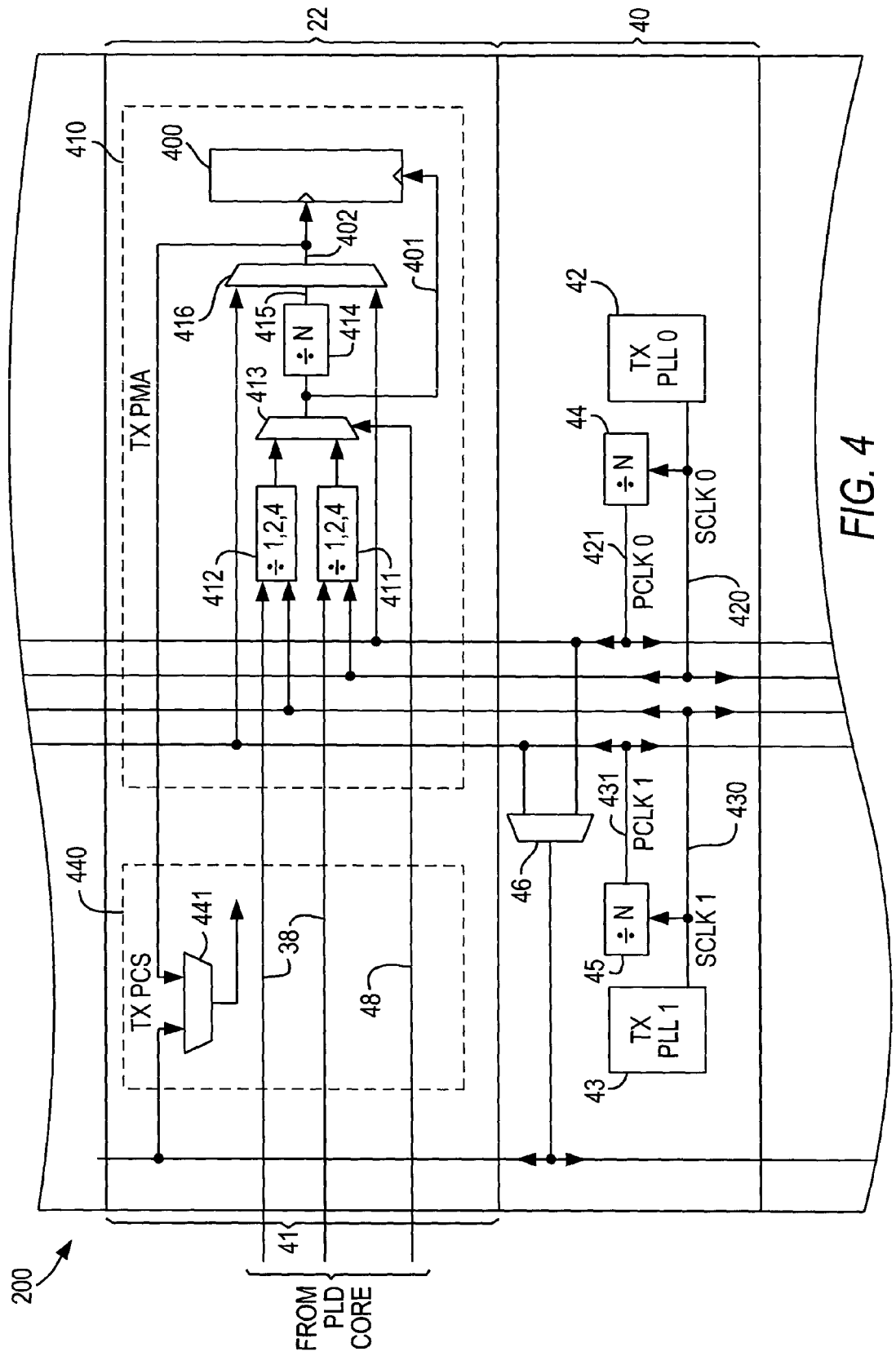
FIG. 4 is a schematic diagram showing detail of the central control circuitry and one transceiver of one quad of a second preferred embodiment of the interface of FIG. 2.

FIG. 4 shows an arrangement affording even greater flexibility in providing different clock rates. FIG. 4 shows an alternative embodiment 40 of a portion of central logic 27, as well as an alternative embodiment 41 of a portion of transmitter 25 of channel 22. Central logic 40 has two clock sources (e.g., PLLs) 42, 43 providing respective high-speed serial clocks (SCLK0, SCLK1) 420, 430. Dividers 44, 45 derive respective parallel clocks (PCLK0, PCLK1) 421, 431 from serial clocks 420, 430. All of clocks 420, 421, 430, 431 are made available to the various channels. It should be noted that while FIG. 4 shows two central clock sources, any number of central clock sources may be provided within the area constraints of PLD 10, depending on how much of PLD 10 one is willing to devote to additional clock sources. If any application requires more clock choices than are provided in a single quad 200, additional clocks may be provided in a second quad 201, if present.

As seen, physical medium attachment ("PMA") portion 410 of transmitter 41 has two dividers 411, 412, which are used to divide serial clocks 420, 430, respectively. Again, as in FIG. 3, both dividers 411, 412 provide the same choice of divisors (1, 2, 4), although the choices provided by the two different dividers could be different, and more dividers or bigger dividers with additional divisors can be provided. And as again also seen in FIG. 3, the selection of which divisor is used by each divider 411, 412 may be made by user programming of PLD 10 or by user logic in the PLD core via lead 38. The choice of whether the output of divider 411 (divided clock 420) or divider 412 (divided clock 430) is used in PMA 410 is made by multiplexer 413, based on user programming or core logic control (via lead 48). The serial clock selected by multiplexer 413 is provided to serializer 400 on lead 401.

The serial clock selected by multiplexer 413 also is provided to divider 414 to generate a corresponding parallel clock, although the parallel clock also could be generated, as in FIG. 3, by providing additional dividers (not shown), corresponding to dividers 411, 412, respectively, on centrally generated parallel clocks 421, 431. Similarly, in the embodiment of FIG. 3, the parallel clock in each channel could be derived, as here in FIG. 4, by first deriving the local serial clock using divider 34 or 36, and then dividing that local serial clock using a divider (not shown) to derive a local parallel clock.

The parallel clock 415 generated by divider 414 preferably is selected by multiplexer 416 and provided to serializer 400 on lead 402. Clock 415 preferably also is fed back to physical coding sublayer ("PCS") portion 440 of transmitter 41 which uses clock 415 to provide to serializer 400 the data to be serialized.

It should be noted that interface 20 also could be operated in a mode (e.g., when using the XAUI standard) in which all channels operate synchronously. In such a case, one of clocks 420, 430 will be used as the serial clock and the corresponding parallel clock 421 or 431 will be used. In such a case, divider 411 or 412 will be set to divide by 1 to provide the serial clock, and to enhance synchronization, centrally provided parallel clock 421 or 431 will be selected by multiplexer 416 and provided to serializer 400, rather than using divider 414 to provide the parallel clock. In this case, multiplexer 441 of PCS 440 will select the centrally generated parallel clock provided to all channels by multiplexer 46, and will ignore the parallel clock selected by multiplexer 416. Even though multiplexer 416 in this case is selecting the same centrally generated clock, there is less skew if PCS 440 of each channel receives the parallel clock directly, without the clock having to pass through respective PMA 410.

Figure 5:
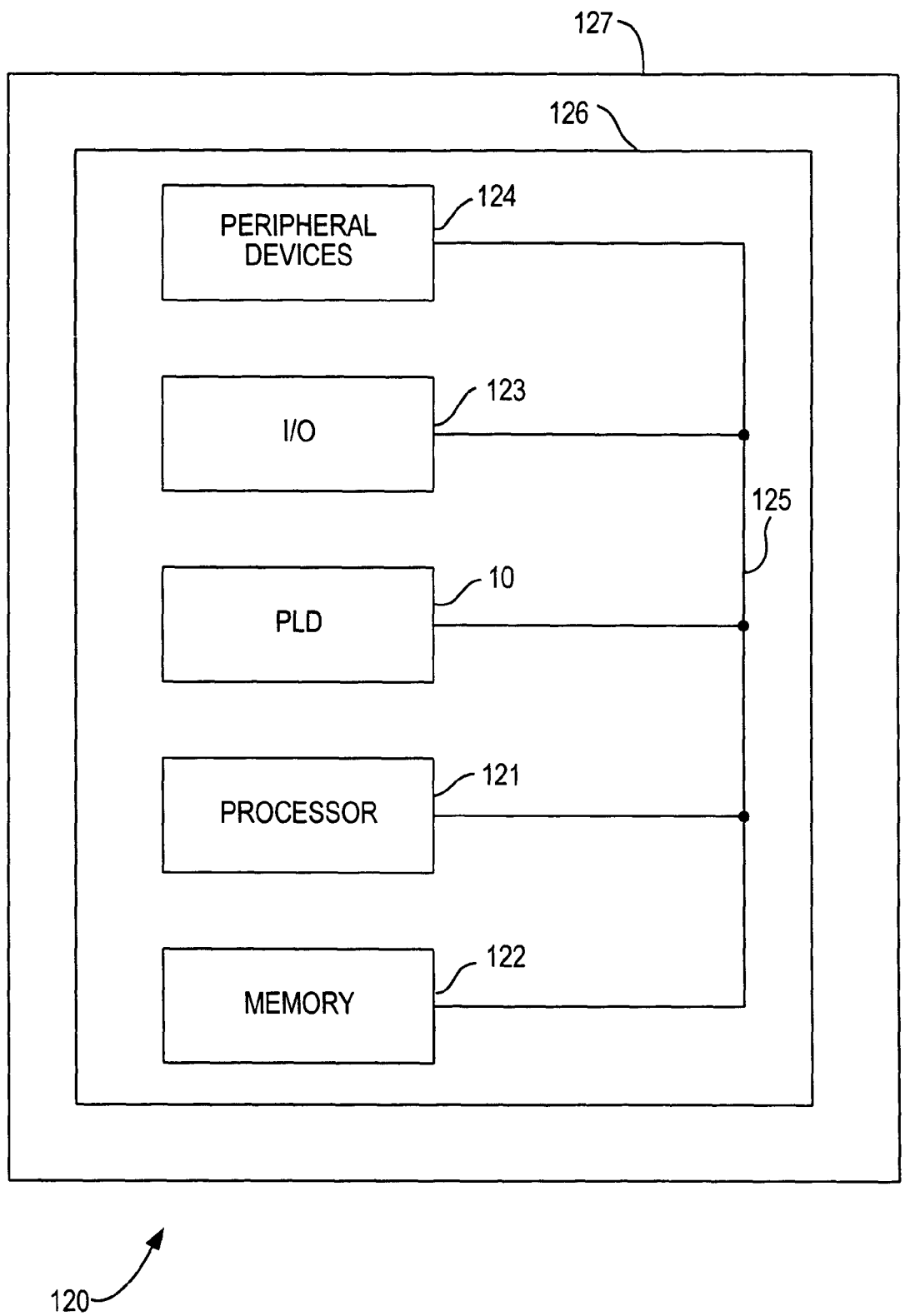
FIG. 5 is a simplified block diagram of an illustrative system employing a programmable logic device incorporating a serial interface in accordance with the present invention.

A PLD 10 incorporating interfaces 20 according to the present invention may be used in many kinds of electronic devices. One possible use is in a data processing system 120 shown in FIG. 5. Data processing system 120 may include one or more of the following components: a processor 121; memory 122; I/O circuitry 123; and peripheral devices 1244. These components are coupled together by a system bus 125 and are populated on a circuit board 126 which is contained in an end-user system 127.

System 120 can be used in a wide variety of applications, such as computer networking, data networking, instrumentation, video processing, digital signal processing, or any other application where the advantage of using programmable or reprogrammable logic is desirable. PLD 10 can be used to perform a variety of different logic functions. For example, PLD 10 can be configured as a processor or controller that works in cooperation with processor 121. PLD 10 may also be used as an arbiter for arbitrating access to a shared resources in system 120. In yet another example, PLD 10 can be configured as an interface between processor 121 and one of the other components in system 120. It should be noted that system 120 is only exemplary, and that the true scope and spirit of the invention should be indicated by the following claims.

Various technologies can be used to implement PLDs 10 as described above and incorporating this invention.

It will be understood that the foregoing is only illustrative of the principles of the invention, and that various modifications can be made by those skilled in the art without departing from the scope and spirit of the invention, and the present invention is limited only by the claims that follow.

What is claimed is:

1. A serial interface for use in a programmable logic device, said serial interface comprising:
   a plurality of channels, each of said channels including at least transmit circuitry;
   central control circuitry including at least one clock source for generating at least one transmit clock for use by said transmit circuitry in each of said channels, each said transmit clock having a respective first clock rate; and
   clock division circuitry in a plurality of said channels for providing from at least one said transmit clock a channel-derived clock having a second clock rate at most equal to said respective first clock rate, said clock division circuitry in each of said plurality of channels being controllable independently of said clock division circuitry in any other of said plurality of channels.

2. The serial interface of claim 1 wherein each of said channels includes said clock division circuitry.

3. The serial interface of claim 1 wherein said clock division circuitry comprises a respective first divider that selectably divides said respective first clock rate by one of a group of at least one integer value.

4. The serial interface of claim 3 wherein said one of said group of at least one integer value is selected by user programming of said programmable logic device.

5. The serial interface of claim 3 wherein said one of said group of at least one integer value is selected under control of logic in said programmable logic device.

6. The serial interface of claim 3 wherein said group of at least one integer value consists of one integer value.

7. The serial interface of claim 3 wherein said group of at least one integer value comprises a plurality of integer values.

8. The serial interface of claim 1 further comprising a selector for selecting as said channel-derived clock one of (a) one said at least one transmit clock, and (b) output of said clock division circuitry.

9. The serial interface of claim 8 wherein said selector comprises a multiplexer.

10. The serial interface of claim 1 wherein said at least one clock source consists of a single clock source generating a single transmit clock having a single transmit clock rate.

11. The serial interface of claim 1 wherein said at least one clock source comprises a plurality of clock sources, each of said clock sources generating its own respective first clock rate.

12. The serial interface of claim 11 further comprising a selector for selecting as said channel-derived clock one of (a) one of said plurality of clock sources, and (b) output of said clock division circuitry.

13. The serial interface of claim 12 wherein said selector comprises a multiplexer.

14. The serial interface of claim 11 wherein:
said clock division circuitry comprises a respective divider for dividing each said respective first clock rate by a respective selectable integer value; and
said serial interface further comprises a selector for selecting said channel-derived clock from among outputs of said respective dividers.

15. The serial interface of claim 14 wherein said selector comprises a multiplexer.

16. A serial interface for use in a programmable logic device, said serial interface comprising:
a plurality of channels, each of said channels including at least transmit circuitry;
central control circuitry including:
at least one clock source for generating at least one transmit clock for use by said transmit circuitry in each of said channels, each said transmit clock being a serial clock having a respective first clock rate that is a serial clock rate, and
for each said at least one clock source, a divider for deriving from each said transmit clock a respective parallel clock having a respective parallel clock rate; and
clock division circuitry in at least one of said channels for providing from at least one said transmit clock a channel-derived clock having a second clock rate at most equal to said respective first clock rate; wherein:
said clock division circuitry derives a channel-derived serial clock having a second clock rate at most equal to said respective first clock rate, and a channel-derived parallel clock having a channel-derived parallel clock rate at most equal to said respective parallel clock rate.

17. A programmable logic device comprising the serial interface of claim 1.

18. A digital processing system comprising:
processing circuitry;
a memory coupled to said processing circuitry; and
a programmable logic device as defined in claim 17 coupled to the processing circuitry and the memory.

19. A printed circuit board on which is mounted a programmable logic device as defined in claim 17.

20. The printed circuit board defined in claim 19 further comprising:
memory circuitry mounted on the printed circuit board and coupled to the programmable logic device.

21. The printed circuit board defined in claim 20 further comprising:
processing circuitry mounted on the printed circuit board and coupled to the memory circuitry.

22. An integrated circuit device comprising the serial interface of claim 1.

23. A digital processing system comprising:
processing circuitry;
a memory coupled to said processing circuitry; and
an integrated circuit device as defined in claim 22 coupled to the processing circuitry and the memory.

24. A printed circuit board on which is mounted an integrated circuit device as defined in claim 22.

25. The printed circuit board defined in claim 24 further comprising:
memory circuitry mounted on the printed circuit board and coupled to the integrated circuit device.

26. The printed circuit board defined in claim 25 further comprising:
processing circuitry mounted on the printed circuit board and coupled to the memory circuitry.

27. A programmable logic device comprising:
a programmable logic core; and
serial interface means comprising:
a plurality of channel means, each of said channel means including at least transmit means;
central control means including at least one clock means for generating at least one transmit clock for use by said transmit means in each of said channel means, each said transmit clock having a respective first clock rate; and
clock division means in a plurality of said channel means for providing from at least one said transmit clock a channel-derived clock having a second clock rate at most equal to said respective first clock rate, said clock division means in each of said plurality of channels being controllable independently of said clock division means in any other of said plurality of channels.

* * * * *